United States Patent
Sato et al.

(10) Patent No.: US 11,798,265 B2
(45) Date of Patent: Oct. 24, 2023

(54) TEACHING DATA CORRECTION METHOD FOR TRAINING IMAGE, TEACHING DATA CORRECTION DEVICE AND PROGRAM

(71) Applicant: NEC Corporation, Tokyo (JP)

(72) Inventors: Hideaki Sato, Tokyo (JP); Soma Shiraishi, Tokyo (JP); Yasunori Babazaki, Tokyo (JP); Jun Piao, Tokyo (JP)

(73) Assignee: NEC CORPORATION, Tokyo (JP)

( * ) Notice: Subject to any disclaimer, the term of this patent is extended or adjusted under 35 U.S.C. 154(b) by 233 days.

(21) Appl. No.: 17/436,716

(22) PCT Filed: Mar. 14, 2019

(86) PCT No.: PCT/JP2019/010565
§ 371 (c)(1),
(2) Date: Sep. 7, 2021

(87) PCT Pub. No.: WO2020/183706
PCT Pub. Date: Sep. 17, 2020

(65) Prior Publication Data
US 2022/0172457 A1    Jun. 2, 2022

(51) Int. Cl.
*G06V 10/774*   (2022.01)
*G06V 10/422*   (2022.01)
*G06V 10/25*    (2022.01)

(52) U.S. Cl.
CPC ............ *G06V 10/774* (2022.01); *G06V 10/25* (2022.01); *G06V 10/422* (2022.01)

(58) Field of Classification Search
CPC ........ G06T 7/00; G06V 10/25; G06V 10/422; G06V 10/774; G06V 40/161
See application file for complete search history.

(56) References Cited

U.S. PATENT DOCUMENTS

2002/0012467 A1   1/2002   Shiratani
2010/0103279 A1*  4/2010   Shiratani ................. G06F 18/28
                                                 348/222.1
(Continued)

FOREIGN PATENT DOCUMENTS

JP    2002-032751 A    1/2002
JP    2011-100459 A    5/2011
(Continued)

OTHER PUBLICATIONS

International Search Report for PCT Application No. PCT/JP2019/010565, dated Jun. 13, 2019.

*Primary Examiner* — Michael J Vanchy, Jr.
(74) *Attorney, Agent, or Firm* — Sughrue Mion, PLLC

(57) ABSTRACT

A teaching data correction device sets, for teaching data indicating an object area where an object of interest exists in a training image, a correction candidate area which is an area to be a correction candidate of the object area, the training image being used for learning. The teaching data correction device generates an output machine based on the correction candidate area, the output machine being learned to output, when an image is inputted thereto, an identification result or a regression result relating to the object of the interest. Then, the teaching data correction device updates the teaching data by the correction candidate area based on an accuracy of the output machine, the accuracy being calculated based on the identification result or the regression result outputted by the output machine.

20 Claims, 12 Drawing Sheets

(56) References Cited

U.S. PATENT DOCUMENTS

2015/0169938 A1* 6/2015 Yao .................. G06V 40/176
                                                382/103
2018/0137644 A1* 5/2018 Rad .................. G06V 10/242

FOREIGN PATENT DOCUMENTS

JP          2012-190159 A     10/2012
JP          2018-169672 A     11/2018

* cited by examiner

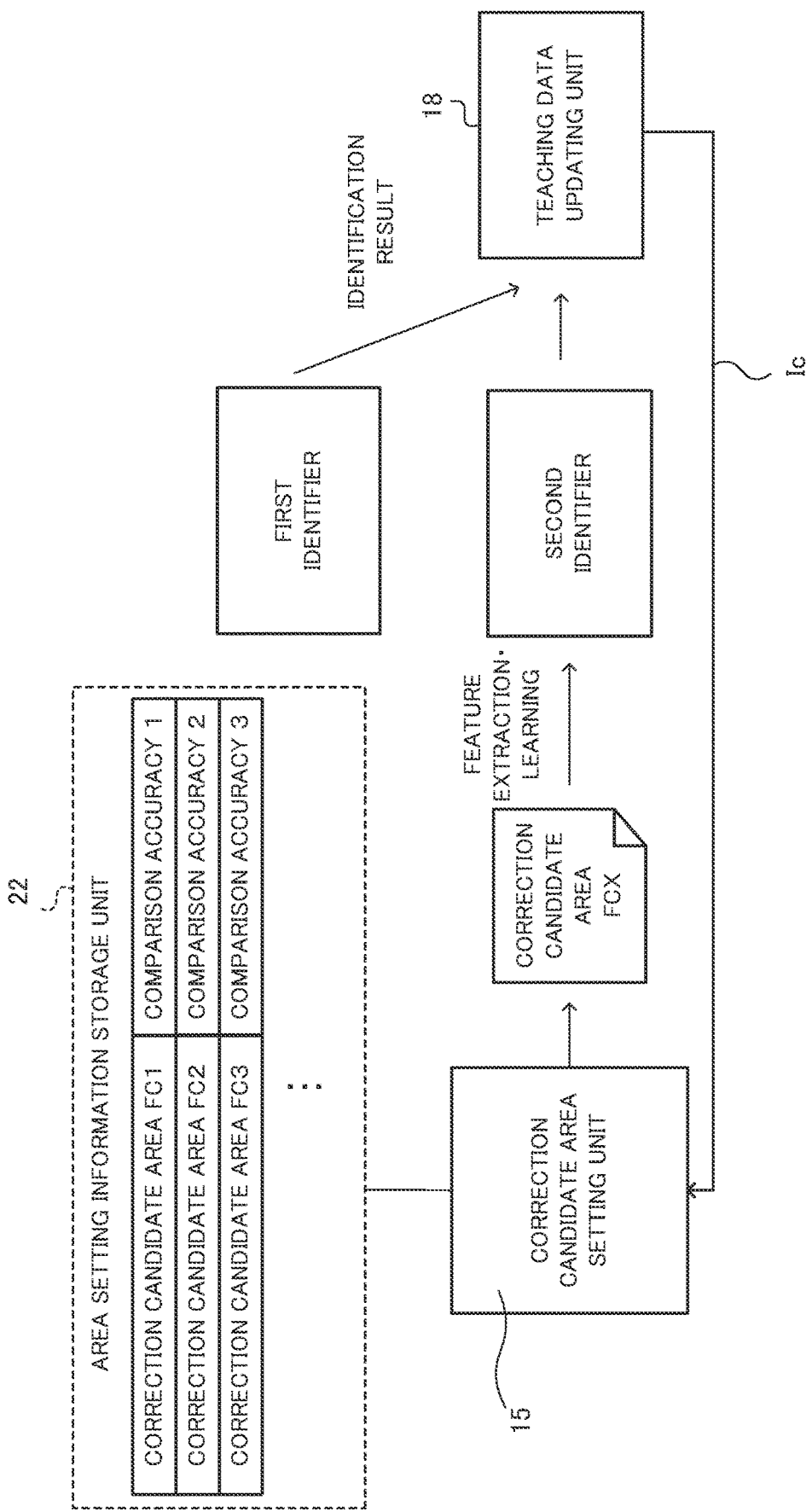

TEACHING DATA CORRECTION METHOD FOR TRAINING IMAGE, TEACHING DATA CORRECTION DEVICE AND PROGRAM

This application is a National Stage Entry of PCT/JP2019/010565 filed on Mar. 14, 2019, the contents of all of which are incorporated herein by reference, in their entirety.

TECHNICAL FIELD

The present invention relates to a technical field of a method for correcting teaching data necessary for machine learning, a teaching data correction device and a program.

BACKGROUND ART

A technique relating to generation and processing of teaching data for use in machine learning is disclosed in Patent Literature 1. Patent Literature 1 describes a method of: acquiring training images classified into a plurality of patterns; identifying a shortage pattern in which the number of belonging training images is small; and generating a new training image belonging to a shortage pattern by performing enlargement, reduction, or translation for a certain training image.

PRIOR ART DOCUMENTS

Patent Literature

Patent Literature 1: JP2018-169672A

SUMMARY OF THE INVENTION

Problem to be Solved by the Invention

Generally, the annotation work for generating the teaching data which indicates the area of a target object to be identified is performed by such method which depends on individual skills, and the training of the learning model is performed so as to identify the target object by specifying the area that approximates the generated teaching data. On the other hand, it cannot be said that the teaching data generated through such method which depends on individual skills necessarily indicates the area of the target object suitable for the identification. Therefore, it is necessary to correct the teaching data so that the identification accuracy is improved in order to carry out the learning of the learning model with higher identification accuracy. Although Patent Literature 1 describes generating a new training image belonging to the insufficient pattern, it does not disclose correcting the teaching data so as to improve the identification accuracy.

In view of the above-described issues, it is therefore an example object of the present disclosure to provide a correction method, a teaching data correction device and a program capable of suitably correcting the teaching data.

Means for Solving the Problem

One mode of the correction method is a correction method executed by a teaching data correction device, the correction method including: setting, for teaching data indicating an object area where an object of interest exists in a training image, a correction candidate area which is an area to be a correction candidate of the object area, the training image being used for learning; generating an output machine based on the correction candidate area, the output machine being learned to output, when an image is inputted thereto, an identification result or a regression result relating to the object of the interest; and updating the teaching data by the correction candidate area based on an accuracy of the output machine, the accuracy being calculated based on the identification result or the regression result outputted by the output machine.

One mode of the teaching data correction device is a teaching data correction device including: a correction candidate area setting unit configured to set, for teaching data indicating an object area where an object of interest exists in a training image, a correction candidate area which is an area to be a correction candidate of the object area, the training image being used for learning; a learning unit configured to generate an output machine based on the correction candidate area, the output machine being learned to output, when an image is inputted thereto, an identification result or a regression result relating to the object of the interest; and a teaching data updating unit configured to update the teaching data by the correction candidate area based on an accuracy of the output machine, the accuracy being calculated based on the identification result or the regression result outputted by the output machine.

One mode of the program is a program executed by a computer, the program causing the computer to function as: a correction candidate area setting unit configured to set, for teaching data indicating an object area where an object of interest exists in a training image, a correction candidate area which is an area to be a correction candidate of the object area, the training image being used for learning; a learning unit configured to generate an output machine based on the correction candidate area, the output machine being learned to output, when an image is inputted thereto, an identification result or a regression result relating to the object of the interest; and a teaching data updating unit configured to update the teaching data by the correction candidate area based on an accuracy of the output machine, the accuracy being calculated based on the identification result or the regression result outputted by the output machine.

Effect of the Invention

An example advantage according to the present invention is to suitably update the teaching data in consideration of the identification accuracy or regression accuracy of the output machine based on the corrected teaching data.

BRIEF DESCRIPTION OF THE DRAWINGS

FIG. 3 illustrates an outline of a process performed by a correction candidate setting unit and a teaching data updating unit.

DESCRIPTION OF EXAMPLE EMBODIMENTS

Hereinafter, an example embodiment of a correction method, a teaching data correction device and a program will be described with reference to the drawings.

First Example Embodiment

[Overall Configuration]

Figure 1:
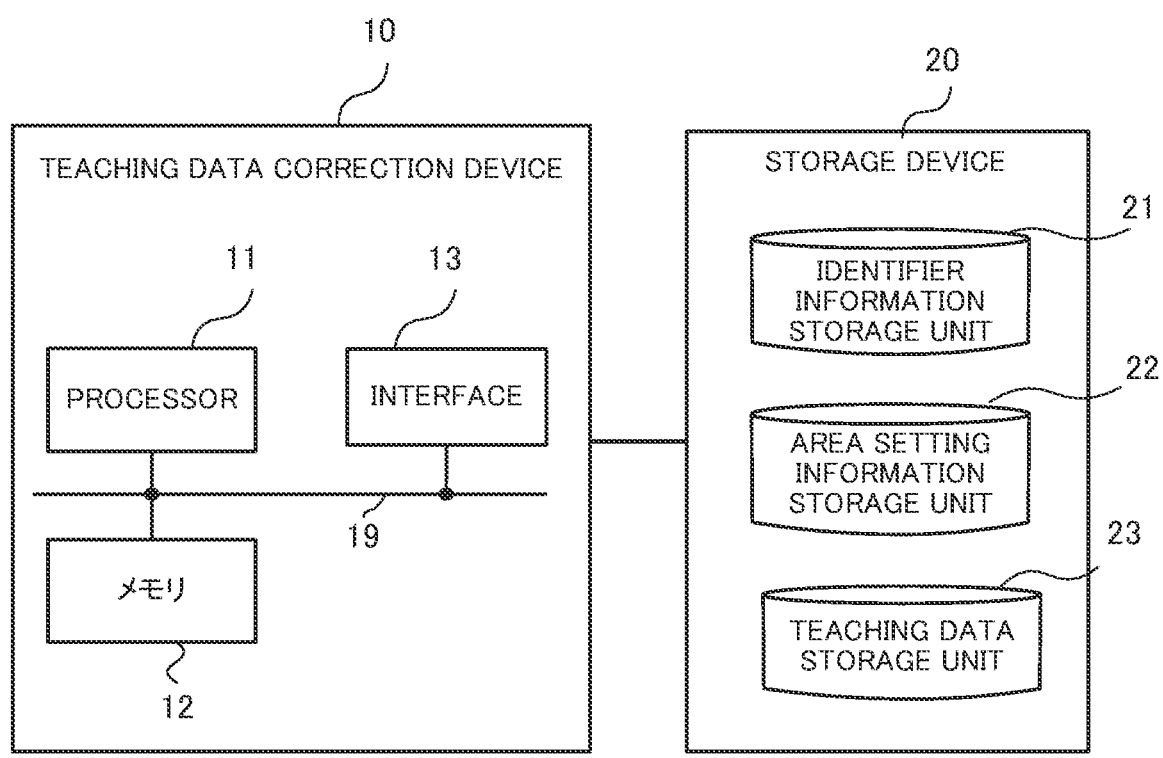
FIG. 1 illustrates a schematic configuration of a teaching data correction system according to a first example embodiment.

FIG. 1 illustrates a schematic configuration of a teaching data correction system 100 according to the first example embodiment. The teaching data correction system 100 corrects teaching data necessary for training a learning model.

The teaching data correction system 100 includes a teaching data correction device 10 and a storage device 20.

The teaching data correction device 10 corrects the teaching data stored in the teaching data storage unit 23 of the storage device 20 to be described later. Here, the teaching data is data indicating a correct answer (solution) regarding an image (also referred to as a "training image") used for training a learning model. Details of the teaching data will be described later.

The storage device 20 is a device to which the teaching data correction device 10 can refer and write data, and includes an identifier information storage unit 21, an area setting information storage unit 22, and a teaching data storage unit 23. The storage device 20 may be an external storage device such as a hard disk connected to or built into the teaching data correction device 10, may be a storage medium such as a flash memory, or may be a server device that performs data communication with the teaching data correction device 10. The storage device 20 may also include a plurality of storage devices capable of communicating data with the teaching data correction device 10. In this case, the plurality of storage devices which function as the storage device 20 stores the identifier information storage unit 21, the area setting information storage unit 22 and the teaching data storage unit 23 which are distributed into two or more.

The identifier information storage unit 21 stores the identifier information that is various information such as parameters necessary to configure the identifier generated by learning a learning model (i.e., identification model) that outputs, when a training image is inputted thereto, the identification result relating to an object to be identified. The above-described parameters in a case where the learning model is a neural network such as a convolutional neural network are, for example, information such as layer structure, neuron structure of each layer, number of filters and filter size in each layer, and weights of each element of each filter.

The area setting information storage unit 22 stores information needed to set an object area that is a candidate of correction for the teaching data that requires correction of the object area. Details of the information stored in the area setting information storage unit 22 will be described later.

The teaching data storage unit 23 stores a plurality of combinations (pairs) of a training image and its teaching data. The teaching data includes information (referred to as "object area information") indicating an area of an object to be identified in the target training image and identification information (i.e., information indicating the type of the object) of the object to be identified. The teaching data may be metadata of the training image or information associated with the identification information of the training image. The object area information of the teaching data is appropriately updated by the teaching data correction device 10. Here, the object to be identified is a specific object or a specific part of the object and examples of the object to be identified include an animal such as a person or fish, a plant, a moving object, a feature, an instrument, or a portion thereof. For example, for a training image used for a learning model which extracts a human area, the object area information of the teaching data indicates an area of a person in the training image.

Next, a hardware configuration of the teaching data correction device 10 will be described with reference to FIG. 1. The teaching data correction device 10 includes, as hardware, a processor 11, a memory 12 and an interface 13. The processor 11, the memory 12 and the interface 13 are connected via a data bus 19.

The processor 11 executes a predetermined process by executing a program stored in the memory 12. The processor 11 is a processor such as a CPU (Central Processing Unit) or a GPU (Graphics Processing Unit).

The memory 12 includes various memories such as a RAM (Random Access Memory), a ROM (Read Only Memory), and a flash memory. The memory 12 stores a program for executing a process related to learning (training) executed by the teaching data correction device 10. The memory 12 is used as a work memory and temporarily stores information acquired from the storage device 20. The memory 12 may function as a storage device 20. In this case, the memory 12 includes the identifier information storage unit 21, the area setting information storage unit 22 and the teaching data storage unit 23. The storage device 20 may function as a memory 12 of the teaching data correction device 10.

The interface 13 is a communication interface for wired or wireless transmission and reception of data to and from the storage device 20 under the control of the processor 11, and includes a network adapter and the like. The teaching data correction device 10 and the storage device 20 may be connected by a cable or the like. In this case, the interface 13 may be a communication interface for performing data communication with the storage device 20 or an interface that conforms to a USB, a SATA (Serial AT Attachment) and the like for exchanging data with the storage device 20.

The hardware configuration of the teaching data correction device 10 is not limited to the configuration shown in FIG. 1. For example, the teaching data correction device 10 may further include an input unit for receiving a user input, an output unit such as a display or a speaker, and the like.

Further, the teaching data correction device 10 may be configured by a plurality of devices. In this case, each of these devices exchanges information necessary for each device to execute an allocated predetermined processing with other devices.

[Teaching Data Correction Process]

Next, a detailed description will be given of a teaching data correction process executed by the teaching data correction device 10.

Figure 2:
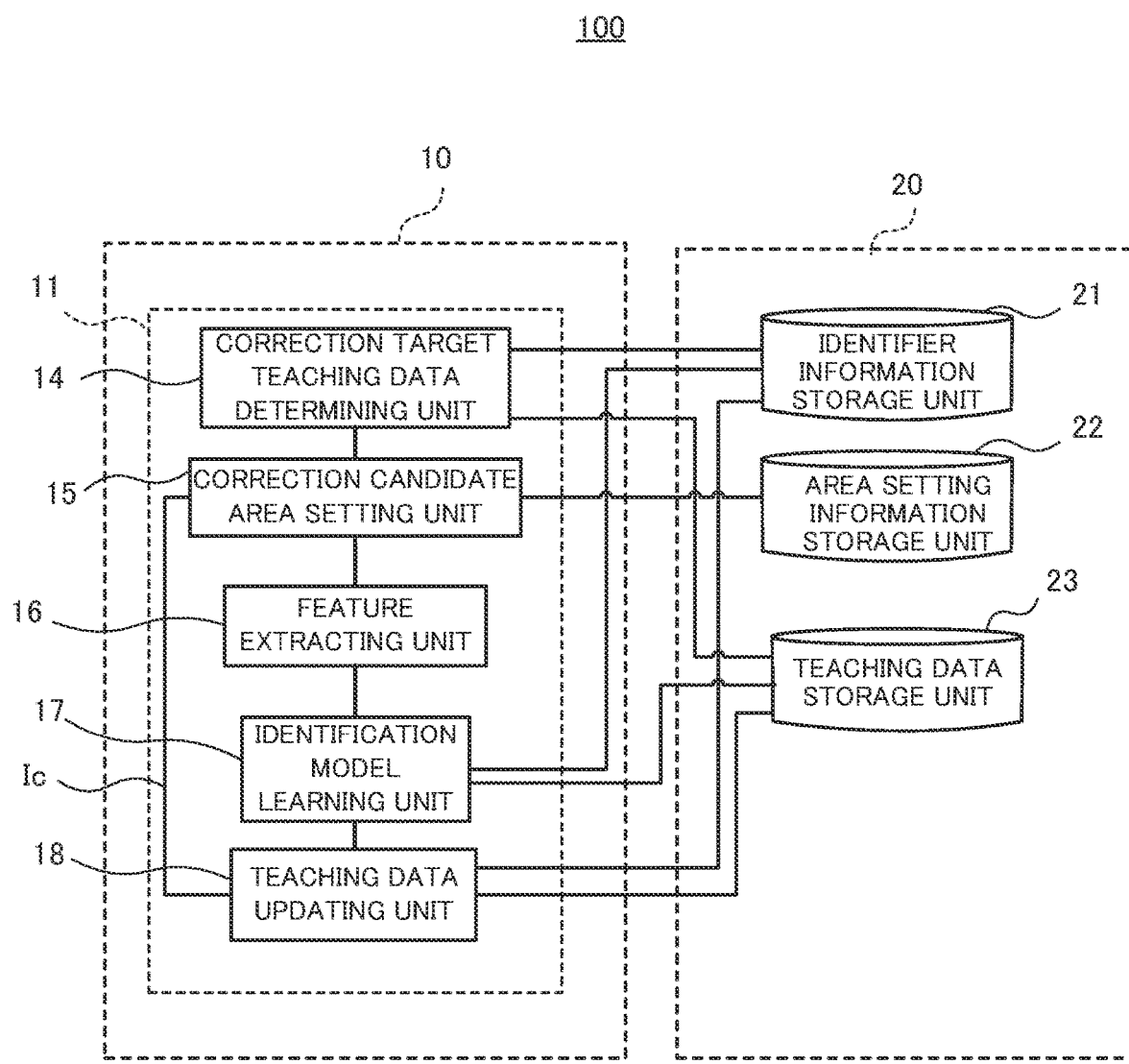
FIG. 2 is a functional block diagram of a teaching data correction device.

FIG. 2 is a functional block diagram of the teaching data correction device 10. As shown in FIG. 2, the processor 11 of the teaching data correction device 10 functionally includes a correction target teaching data determining unit 14, a correction candidate area setting unit 15, a feature extracting unit 16, an identification model learning unit 17 and a teaching data updating unit 18.

The correction target teaching data determining unit 14 determines teaching data (also referred to as "correction target teaching data DT") which requires correction of the object area on the basis of the identification result obtained by inputting an image corresponding to the teaching data to the identifier configured by the identifier information stored in the identifier information storage unit 21. Then, the correction target teaching data determining unit 14 supplies information relating to the determined correction target teaching data DT to the correction candidate area setting unit 15.

It is noted that the identifier information storage unit 21 stores the identifier information indicative of the identifier obtained by learning an identification model based on the teaching data stored in the teaching data storage unit 23. The above-described identification model is, for example, an arithmetic model configured to output a determination result regarding the presence or absence of an identification target in the input image, and it may be a learning model based on a neural network or may be another type of learning model such as a support vector machine. As will be described later, the identifier information stored in the identifier information storage unit 21 is updated based on the identifier information indicative of the identifier generated by the identification model learning unit 17.

The correction candidate area setting unit 15 refers to the area setting information storage unit 22 and sets an object area (also referred to as a "correction candidate area FC") as a candidate of correction of the area indicated by the object area information which is included in the correction target teaching data DT determined by the correction target teaching data determining unit 14. The setting method of the correction candidate area FC will be described later with reference to FIG. 3. Then, the correction candidate area setting unit 15 supplies information indicative of the correction candidate area FC to the feature extracting unit 16. In addition, when the correction candidate area setting unit 15 subsequently receives the accuracy comparison information "Ic" from the teaching data updating unit 18, the correction candidate area setting unit 15 associates the information indicative of the correction candidate area FC with the accuracy comparison information Ic and stores them in the area setting information storage unit 22. Then, in this case, the correction candidate area setting unit 15 sets a correction candidate area FC different from any previously-set correction candidate area FC, and supplies information indicative of the set correction candidate area FC to the feature extracting unit 16.

For example, the correction candidate area setting unit 15 may be implemented by any model that searches for appropriate parameters. In other words, the correction candidate area setting unit 15 may be realized by any calculation model configured to output, on the basis of the accuracy comparison information Ic supplied from the teaching data updating unit 18, correction candidate area FC to be set next. Examples of such models may include a reinforcement learning model such as Deep-Q-Network (DQNs), a genetic algorithm, a Q-Learning and any other models based on various techniques.

Here, when the correction candidate area setting unit 15 is realized by learning a learning model such as DQN, the information indicative of the parameters of the correction candidate area setting unit 15 obtained by learning the learning model is stored in, for example, the identification device information storage unit 21 or the area setting information storage unit 22. In this case, the correction candidate area setting unit 15 sets the correction candidate area FC by referring to the information indicative of the parameters stored in the identifier information storage unit 21 or the area setting information storage unit 22.

The feature extracting unit 16 extracts feature(s) from the training image corresponding to the correction candidate area FC supplied from the correction candidate area setting unit 15. In this case, the features extracted by the feature extraction unit 16 are features used for determining the presence or absence of an identification target. For example, when a person's face is determined as an identification target, the feature extraction unit 16 extracts the nose, the mouth, the eye, and the like as features. Such features may be features obtained from a convolutional neural network or the like, and may be features determined by a manual method. The feature extraction part 16 may be realized by any feature extraction technique. Examples of the feature extracting unit 16 include a SIFT (Scale Invariant Feature Transform), SURF (Speeded-Up Robust Features), AKAZE (Accelerated-KAZE) and Hog (Histograms of Oriented Gradients). The feature extracting unit 16 supplies feature information, which is information indicative of the extracted features, to the identification model learning unit 17. It is noted that the feature extracting unit 16 may also perform feature extraction for the teaching data other than the correction target teaching data DT indicating the object area of the same identification target and then includes the feature extraction result in the feature information to be supplied to the identification model learning unit 17.

The identification model learning unit 17 generates the identifier by training the learning model based on the feature information supplied from the feature extracting unit 16. The learning model used here is, for example, an identification model configured to output, when feature information or an image is inputted thereto, a determination result relating to the presence or absence of the identification target, and it may be a learning model based on a neural network, or may be another type of learning model such as a support vector machine. Then, the identification model learning unit 17 supplies the identifier information relating to the identifier obtained by the training to the teaching data updating unit 18.

The teaching data updating unit 18 calculates the identification accuracy when a training image corresponding to the teaching data stored in the teaching data storage unit 23 is inputted to an identifier (hereinafter referred to as "first identifier") based on the identifier information stored in the identifier information storage unit 21, which is generated before the generation of the identifier by the identification model learning unit 17. Further, the teaching data updating unit 18 calculates the identification accuracy when the training image stored in the teaching data storage unit 23 is inputted to the identifier (hereinafter referred to as "second identifier") based on the identifier information generated by the identification model learning unit 17. Then, the teaching data updating unit 18 supplies information (also referred to as "accuracy comparison information Ic") indicating the comparison result between the identification accuracy of the first identifier and the identification accuracy of the second identifier to the correction candidate area setting unit 15. Instead of directly inputting the training image to the first identifier and the second identifier, the feature information indicating features extracted from the training image by the same process as the process by the feature extracting unit 16 may be inputted to the first identifier and the second identifier described above.

When the identification accuracy of the second identifier is higher than the identification accuracy of the first identifier, the teaching data updating unit 18 determines that the identification accuracy is improved by changing the object area indicated by the correction target teaching data DT stored in the teaching data storage unit 23 to the correction candidate area FC. Therefore, the teaching data updating unit 18 updates the object area indicated by the correction target teaching data DT stored in the teaching data storage unit 23 by using the correction candidate area FC.

Further, when determining that the identification result of the second identifier is equal to or larger than a predetermined identification accuracy or when determining that the number of times of setting the correction candidate area FC for the same correction target teaching data DT is equal to or larger than a predetermined number of times, the teaching data updating unit 18 terminates the process of setting the correction candidate area FC for the target correction target teaching data DT.

The correction candidate area setting unit 15 which has received the accuracy comparison information Ic from the teaching data updating unit 18 sets a new correction candidate area FC. The setting process of the correction candidate area FC by the correction candidate area setting unit 15 will be described in detail with reference to FIG. 3.

FIG. 3 illustrates an outline of process executed by the correction candidate area setting unit 15 and the teaching data updating unit 18. As shown in FIG. 3, the area setting information storage unit 22 stores the correction candidate area FC (the correction candidate area FC1, the correction candidate area FC2, the correction candidate area FC3, and the like) that has already been set for the correction target teaching data DT in association with the comparison accuracy indicated by the accuracy comparison information Ic supplied from the teaching data updating unit 18 (the comparison accuracy 1, the comparison accuracy 2, the comparison accuracy 3, and the like).

The correction candidate area setting unit 15 refers to the area setting information storage unit 22 and sets a correction candidate area "FCX" different from the correction candidate area FC recorded in the area setting information storage unit 22. In this case, for example, the correction candidate area setting unit 15 determines the correction candidate area FCX based on the correction candidate area FC set immediately before or the correction candidate area FC whose comparison accuracy (i.e., the identification accuracy of the second identifier) stored in the area setting information storage unit 22 is the highest. In the first example, the correction candidate area setting unit 15 sets a correction candidate area FCX that is the above-mentioned correction candidate area FC whose horizontal width or vertical width is enlarged or reduced by a predetermined magnification (e.g., 1.1 times). In the second example, the correction candidate area setting unit 15 sets the correction candidate area FCX that is the above-described correction candidate area FC whose position is shifted by a predetermined distance (for example, one tenth of the object area) to either the horizontal direction or the vertical direction. It is noted that the first example and the second example may be combined.

Thereafter, the feature extracting unit 16 performs feature extraction from the training image corresponding to the correction candidate area FCX, and the identification model learning unit 17 generates the second identifier by performing learning (training) of the identification model based on the extracted features. If the correction candidate area FC and the comparison accuracy are not recorded in the area setting information storage unit 22, the correction candidate area setting unit 15 sets the correction candidate area FCX by applying the above-described enlargement, reduction or shift processing in the vertical or horizontal direction to the object area indicated by the object area information originally included in the target correction target teaching data DT.

The teaching data updating unit 18 acquires the identification result by the first identifier in which the learning is performed based on the teaching data before reflecting the correction candidate area FCX and the identification result by the second identifier in which the learning is performed based on the teaching data after reflecting the correction candidate area FCX, respectively. Then, the teaching data updating unit 18 generates the accuracy comparison information Ic by comparing these identification accuracies. The teaching data before reflecting the correction candidate area FCX may be the teaching data in which the correction candidate area FC set just before the correction candidate area FCX is reflected, or may be the teaching data originally stored in the teaching data storage unit 23 before all the correction candidate areas FC are set.

When receiving the accuracy comparison information Ic from the teaching data updating unit 18, the correction candidate area setting unit 15 stores the correction candidate area FCX and the comparison accuracy "X" indicated by the received accuracy comparison information Ic in the area setting information storage unit 22 in association with each other. In this case, the correction candidate area setting unit 15 refers to the pair(s) of the past correction candidate area FC and the comparison accuracy stored in the area setting information storage unit 22 and then determines the correction candidate area FC to be set next. Then, the correction candidate area setting unit 15 and the teaching data updating unit 18 repeatedly executes the above-described process until it is determined that the identification result by the second identifier is equal to or larger than the predetermined identification accuracy or that the number of times of setting the correction candidate area FC for the same correction target teaching data DT is equal to or larger than the predetermined number of times.

Here, a calculation method of the identification accuracy by the first identifier and the second identifier will be supplementally described. In this case, the teaching data updating unit 18 determines, on the basis of the identification information indicative of the object to be identified included in the teaching data, whether or not the object area of the identification target can be correctly identified as the identification target according to the identification result by the first identifier and the second identifier and whether or not the object area other than the identification target is incorrectly recognized as the identification target according to the identification result by the first identifier and the second identifier. Then, the teaching data updating unit 18 calculates each identification accuracy of the first identifier and the second identifier by statistically processing the determination result for all the teaching data. In this case, a value based on any evaluation index such as a reproduction rate, a fitting rate, a singularity, an accuracy, an F value or the like may be calculated as the identification accuracy.

For example, the accuracy comparison information Ic is information indicating a value obtained by subtracting the identification accuracy of the first identifier from the identification accuracy of the second identifier. The accuracy comparison information Ic may be information indicating a value based on another calculation formula representing the identification accuracy of the second identifier relative to the identification accuracy of the first identifier.

Next, a specific example of setting the correction candidate area FC will be described with reference to FIGS. 4A to 4C and FIGS. 5A to 5C.

Figure 4A:
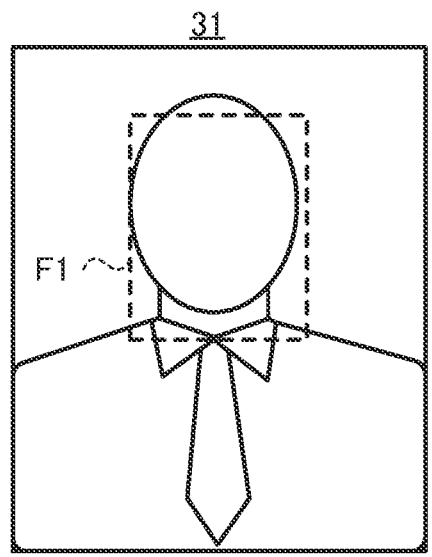
FIG. 4A illustrates an object area on an image corresponding to a correction target teaching data in which a face is an identification target.
Figure 4B:
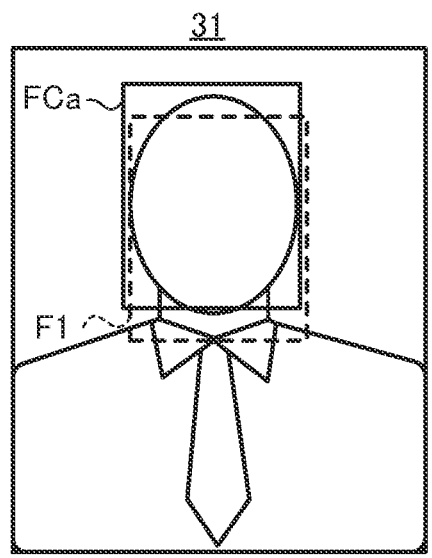
FIG. 4B illustrates a correction candidate area set based on an object area on the image corresponding to the correction target teaching data.
Figure 4C:
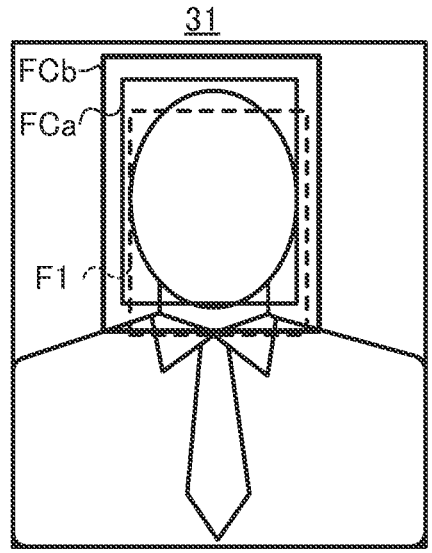
FIG. 4C illustrates a correction candidate area set based on the past correction candidate area on the image corresponding to the correction target teaching data.

FIG. 4A illustrates an object area "F1" on the training image 31 corresponding to the correction target teaching data DT whose identification target is a face, wherein the object area F1 is indicated by the object area information included in the correction target teaching data DT. FIG. 4B illustrates a correction candidate area "FCa" set based on the object area F1 on the training image 31 corresponding to the correction target teaching data DT. FIG. 4C illustrates a correction candidate area "FCb" set based on the correction candidate area FCa on the training image 31 corresponding to the correction target teaching data DT. For convenience, the object area F1 is indicated in FIGS. 4A to 4C by broken line, the correction candidate areas FCa and FCb are indicated by solid line.

The object area F1 of the teaching data shown in FIG. 4A is set to be slightly misaligned with the area of the face to be identified, and when the training image 31 is inputted to the identifier learned using the teaching data, the identification is not performed correctly. In this case, the correction target teaching data determining unit 14 regards the teaching data shown in FIG. 4A as the correction target teaching data DT, and the correction candidate area setting unit 15 sets the correction candidate area FCa (see FIG. 4(B)) based on the object area F1. Here, as an example, the correction candidate area setting unit 15 determines the correction candidate area FCa that is the object area F1 shifted to the left by a predetermined width and shifted upward by a predetermined width.

Further, on the basis of the accuracy comparison information Ic supplied thereafter from the teaching data updating unit 18, the correction candidate area setting unit 15 determines that the identification accuracy is improved as compared with before the reflection of the correction candidate area FCa. Then, the correction candidate area setting unit 15 further set another correction candidate area FCb based on the correction candidate area FCa (see FIG. 4C). Here, as an example, the correction candidate area setting unit 15 sets the correction candidate area FCb obtained by enlarging the correction candidate area FCa by a predetermined magnification. Then, in this case, the teaching data updating unit 18 determines that the identification accuracy after reflecting the correction candidate area FCb has become equal to or higher than a threshold value, and then updates the correction target teaching data DT so that the correction candidate area FCb indicates the object area to be identified. Then, the teaching data updating unit 18 terminates the process.

Figure 5A:
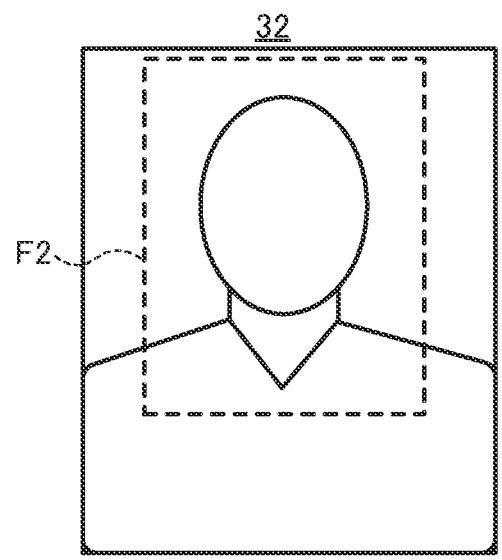
FIG. 5A illustrates object area according to correction target teaching data on an image corresponding to the correction target teaching data in which a face is an identification target.
Figure 5B:
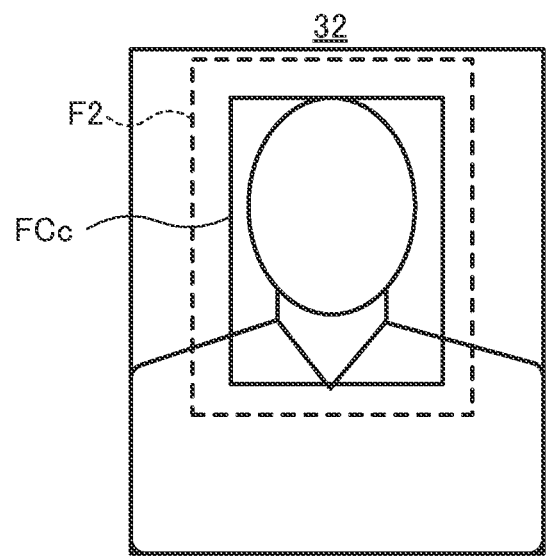
FIG. 5B illustrates a correction candidate area set based on an object area on the image corresponding to the correction target teaching data.
Figure 5C:
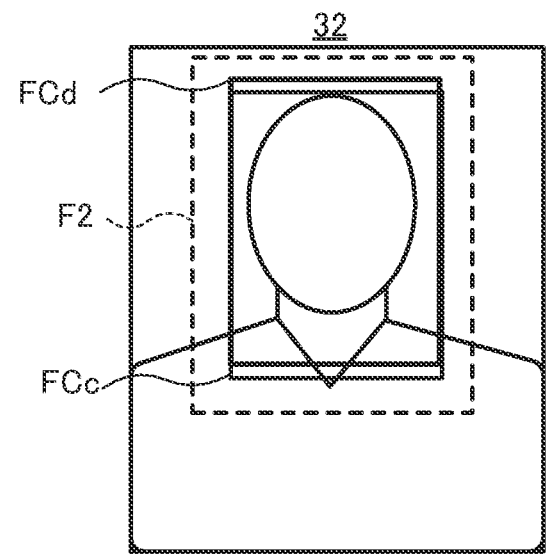
FIG. 5C illustrates a correction candidate area set based on the past correction candidate area on the image corresponding to the correction target teaching data.

FIG. 5A illustrates an object area "F2" on the training image 32 corresponding to the correction target teaching data DT whose identification target is a face, wherein the object area F2 is indicated by the object area information included in the correction target teaching data DT. FIG. 5B illustrates a correction candidate area "FCc" set based on the object area F2 on the training image 32 corresponding to the correction target teaching data DT. FIG. 5C illustrates a correction candidate area "FCd" set based on the correction candidate area FCc on the image of the correction target teaching data DT. For convenience, the object area F2 is indicated in FIGS. 5A to 5B by broken line and the correction candidate areas FCc and FCd are indicated by solid line.

The object area F1 indicated by the teaching data shown in FIG. 5A is set to a range larger than the area of the face to be identified, and when the training image 32 is inputted to the identifier learned using the teaching data, the identification is not performed correctly. In this case, the correction target teaching data determining unit 14 regards the teaching data shown in FIG. 5A as the correction target teaching data DT, and the correction candidate area setting unit 15 determines the correction candidate area FCc (see FIG. 5B) based on the object area F2. Here, as an example, the correction candidate area setting unit 15 sets a correction candidate area FCc obtained by minifying the object area F1 by a predetermined magnification.

Further, on the basis of the accuracy comparison information Ic supplied thereafter from the teaching data updating unit 18, the correction candidate area setting unit 15 determines that the identification accuracy is improved as compared with before the reflection of the correction candidate area FCc. Then, the correction candidate area setting unit 15 determines another correction candidate area FCd (see FIG. 5C) by using the correction candidate area FCc as a reference. Here, as an example, the correction candidate area setting unit 15 sets the correction candidate area FCd that is the correction candidate area FCc shifted upward by a predetermined width. In this case, the teaching data updating unit 18 determines that the identification accuracy after the change to the correction candidate area FCd has become equal to or higher than the threshold value. Then, the teaching data updating unit 18 updates the correction target teaching data DT so that the correction candidate area FCd becomes the object area and terminates the process.

Figure 6:
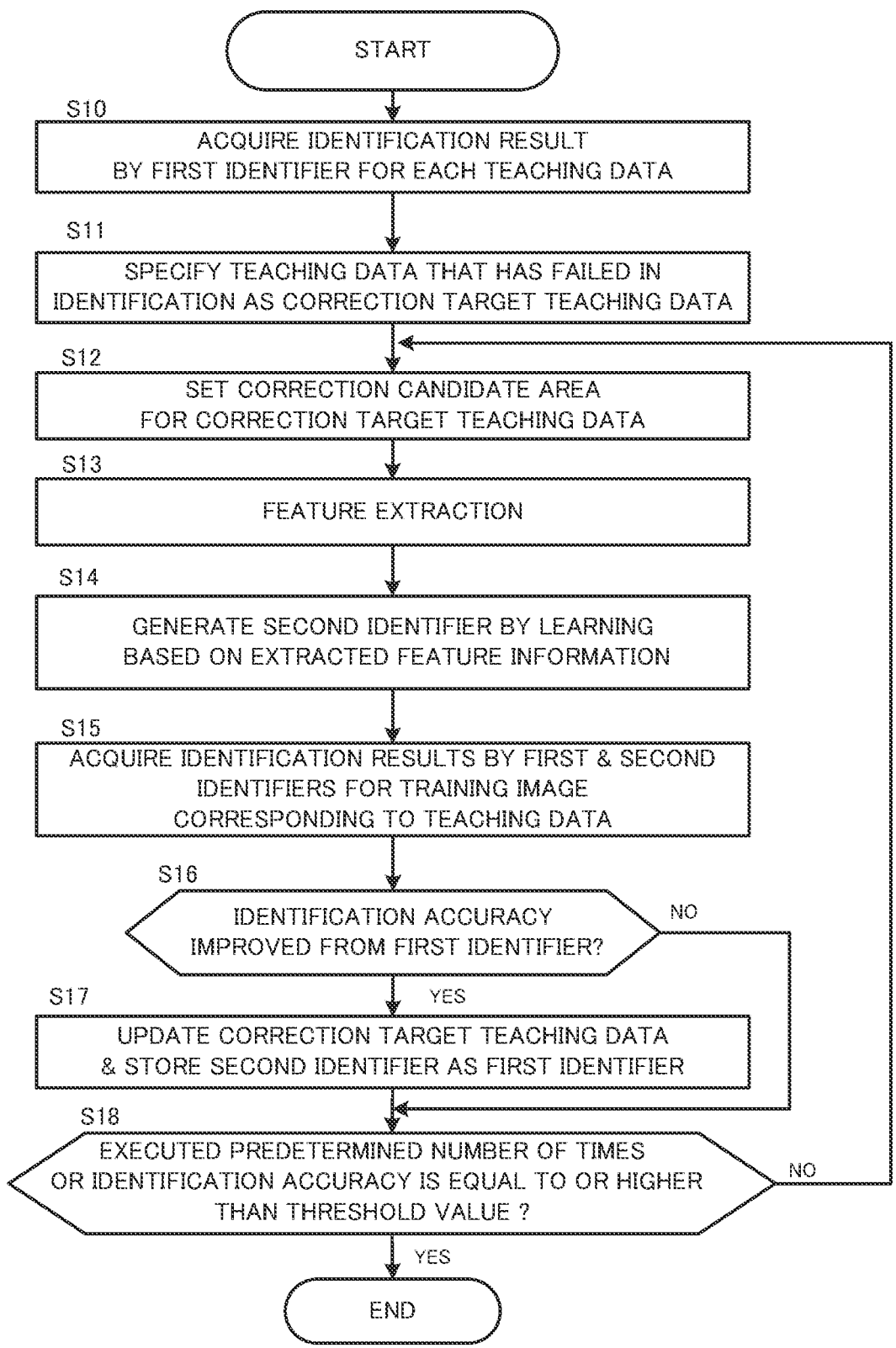
FIG. 6 is a flowchart executed by the teaching data correction device according to the first example embodiment.

FIG. 6 is an example of a flow chart executed by the teaching data correction device 10 according to the first example embodiment.

First, the correction target teaching data determining unit 14 configures a first identifier based on the identifier information stored in the identifier information storage unit 21, and acquires the identification result by the first identifier for each training image corresponding to each of the teaching data stored in the teaching data storage unit 23 (Step S10). Next, the correction target teaching data determining unit 14 specifies the teaching data that has failed in identification by the first identifier as the correction target teaching data DT (Step S11). Then, the teaching data correction device 10 executes the process at following step S12 and subsequent steps for each of the correction target teaching data DT specified at step S11.

First, the correction candidate area setting unit 15 sets the correction candidate area FC for the correction target teaching data DT (step S12). In this case, for example, on the basis of the object area indicated by the object area information included in the correction target teaching data DT or the correction candidate area FC set at previous step S12, the correction candidate area setting unit 15 sets the correction candidate area FC that is not recorded as a history in the area setting information storage unit 22. Then, the correction candidate area setting unit 15 performs the feature extraction on the correction candidate area FC in the training image set at step S12 (step S13).

Then, the identification model learning unit 17 generates the second identifier by training the identification model based on the feature information extracted at step S13 (Step S14).

Next, the teaching data updating unit 18 acquires the respective identification results of the first identifier and the second identifier for the training image corresponding to the teaching data stored in the teaching data storage unit 23 (Step S15). Then, the teaching data updating unit 18 determines whether or not the identification accuracy of the second identifier calculated based on the identification result by the second identifier is higher than the identification accuracy of the first identifier calculated based on the identification result by the first identifier (step S16).

When the identification accuracy of the second identifier is higher than the identification accuracy of the first identifier (step S16; Yes), the teaching data updating unit 18 updates the correction target teaching data DT and stores the identifier information indicative of the second identifier as the identifier information indicative of the first identifier in the identifier information storage unit 21 (step S17). In this case, the teaching data updating unit 18 updates the correction target teaching data DT so that the object area information of the correction target teaching data DT indicates the correction candidate area FC set at step S12.

Then, after the execution of the process at step S17, or when it is determined at step S16 that the identification accuracy of the second identifier is lower than the identification accuracy of the first identifier (step S16; No), the teaching data updating unit 18 executes the process at step S18. In this case, the teaching data updating unit 18 determines whether or not the number of times of setting the correction candidate area FC for the target correction target teaching data DT is equal to or larger than a predetermined number of times or whether or not the identification accuracy based on the identification result at step S15 is equal to or higher than a predetermined threshold value (step S18). The above-described predetermined number of times is predetermined in consideration of, for example, the processing cost of the learning data generation process. The above-described threshold value is predetermined in consideration of, for example, the identification accuracy required in the application or the like.

Then, when the teaching data updating unit 18 determines that the number of times of setting the correction candidate area FC for the target correction target teaching data DT is equal to or larger than the predetermined number of times or the identification accuracy is equal to or higher than the predetermined threshold value (step S18; Yes), the teaching data updating unit 18 terminates the process of the flowchart. In this case, for example, the correction target teaching data determining unit 14 may specify the teaching data that is determined to have failed in identification based on the identification result by the second identifier obtained at step S15 as the correction target teaching data DT and return the processing to step S12. On the other hand, when the setting of the correction candidate area FC is executed less than the predetermined number of times and the identification accuracy is less than the predetermined threshold value (Step S18; No), the teaching data updating unit 18 returns the process to step S12.

Next, a supplementary description will be given of the effect according to the first example embodiment.

Generally, in order to improve the identification accuracy, it is necessary to change the teaching data (specifically, the object area to be a correct answer) so as to be suitable for the identification of the identification target. In contrast, a large amount of cost is incurred for the change by manual operation. Then, in the object detection and identification process according to the currently proposed method, the training is performed so as to approach the object area indicated by the teaching data generated by manual annotation in advance, but it cannot be said that the object area is selected so as to be suitable for identification. Thus, in object detection and identification process, the error function to be set should decrease with the increase in the identification accuracy, and should not depend on such a criterion that the identification result approaches the teaching data based on the manual annotation.

In view of the above, the teaching data correction device 10 according to the first example embodiment corrects the object area information of the teaching data in which the identification has failed so that the identification accuracy by the identifier obtained by learning based on the corrected teaching data is improved. Thus, the correction of the teaching data necessary for improving the identification accuracy can be performed without relying on the individual person's technique, and the burden required for the correction of the teaching data can be suitably reduced.

Second Example Embodiment

Figure 7:
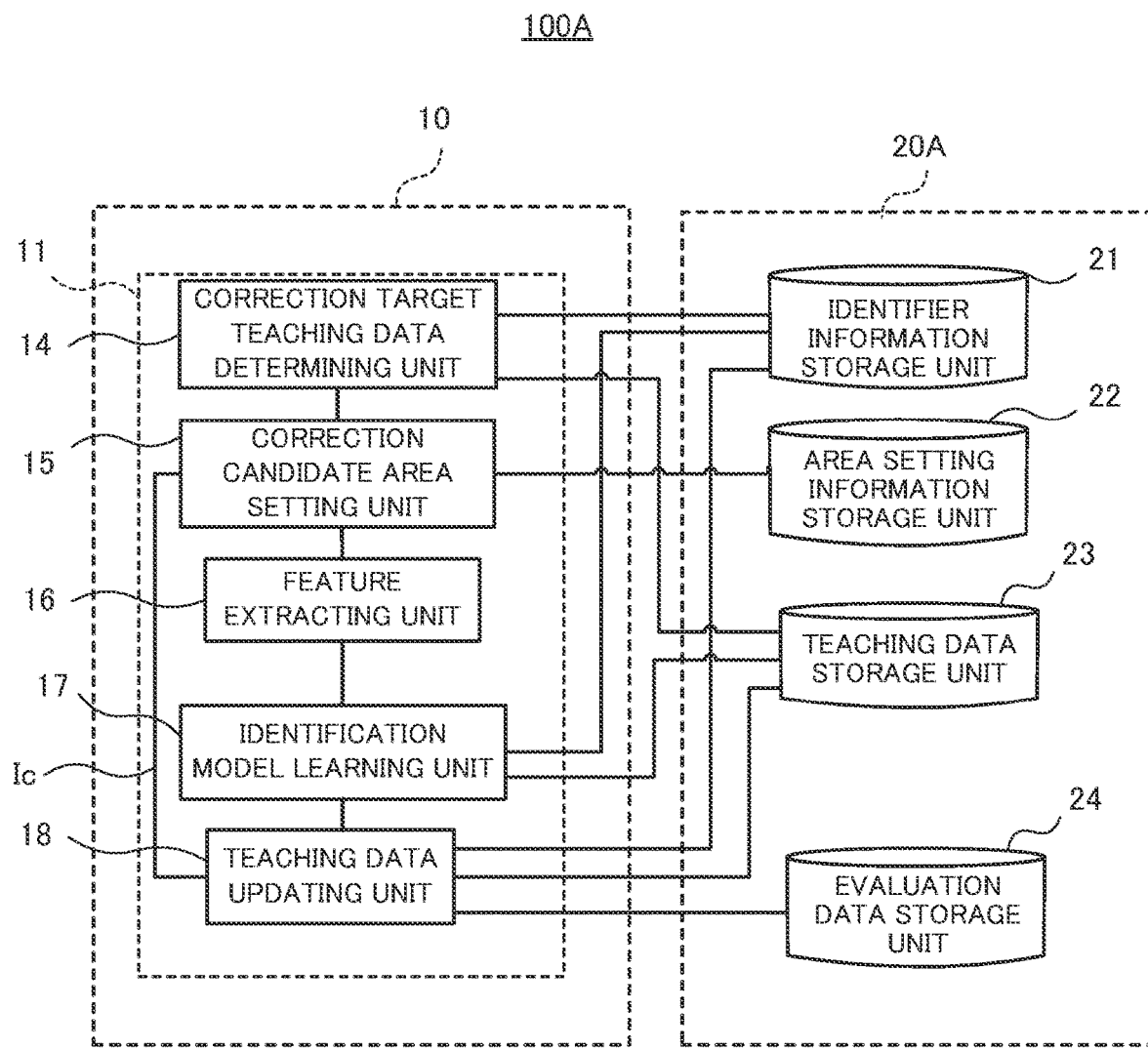
FIG. 7 illustrates a schematic configuration of a teaching data correction system according to a second example embodiment.

FIG. 7 illustrates a schematic configuration of a teaching data correction system 100A according to a second example embodiment. The teaching data correction system 100A according to the second example embodiment differs from the teaching data correction system 100 according to the first example embodiment in that it further includes an evaluation data storage unit 24 that stores evaluation data that is an image used to determine the identification accuracy of the first identifier and the second identifier. Other components which are substantially the same as those of the first example embodiment are denoted by the same reference numerals, and description thereof will be omitted.

The storage device 20A includes the evaluation data storage unit 24. The evaluation data storage unit 24 stores a plurality of images serving as evaluation data. As in the first example embodiment, the storage device 20A may include a plurality of storage devices capable of data communication with the teaching data correction device 10. In this case, the plurality of storage devices which function as the storage device 20 may store the identifier information storage unit 21, the area setting information storage unit 22, the teaching data storage unit 23, and the evaluation data storage unit 24 in a distributed manner.

When comparing the identification accuracy of the first identifier with the identification accuracy of the second identifier, the teaching data updating unit 18 inputs the evaluation data stored in the evaluation data storage unit 24 to each of the first identifier and the second identifier and acquires the identification results thereof for the inputted evaluation data. Then, the teaching data updating unit 18 calculates the identification accuracy of the first identifier based on the identification result outputted by the first identifier, and calculates the identification accuracy of the second identifier based on the identification result outputted by the second identifier.

Figure 8:
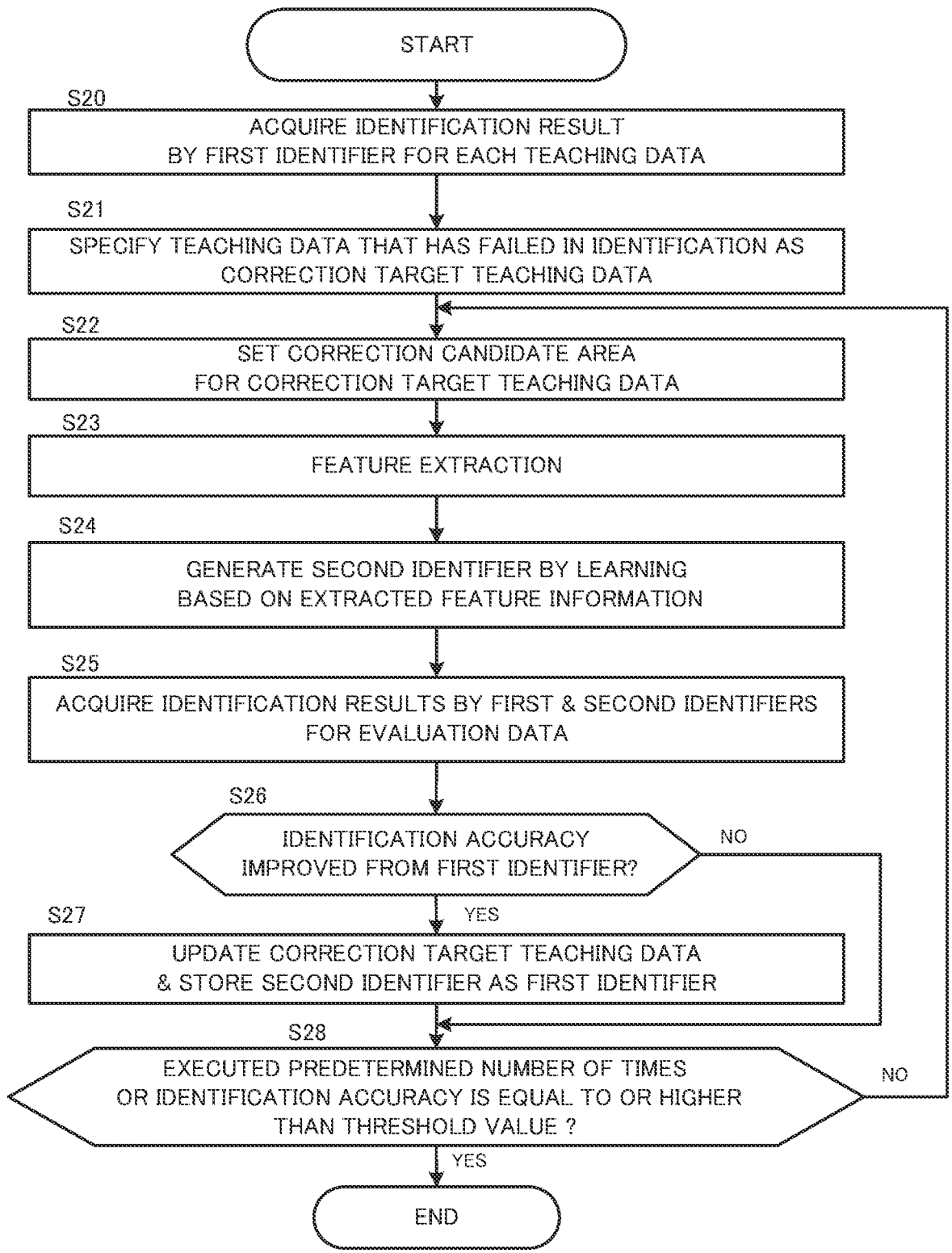
FIG. 8 is a flowchart executed by the teaching data correction device according to the second example embodiment.

FIG. 8 is an example of a flow chart executed by the teaching data correction device 10 according to the second example embodiment.

First, the correction target teaching data determining unit 14 configures a first identifier based on the identifier information stored in the identifier information storage unit 21, and acquires the identification result by the first identifier for the training image corresponding to each of the teaching data stored in the teaching data storage unit 23 (step S20). Next, the correction target teaching data determining unit 14 specifies the teaching data that has failed in identification by the first identifier as the correction target teaching data DT (step S21). Then, the teaching data correction device 10 executes the process at following step S22 and subsequent steps for each of the correction target teaching data DT specified at step S21.

First, the correction candidate area setting unit 15 sets the correction candidate area FC for the correction target teaching data DT (step S22). Then, the correction candidate area setting unit 15 performs feature extraction in the correction candidate area FC, which is set at step S22, in the training image corresponding to the correction target teaching data DT (step S23). Then, the identification model learning unit 17 generates the second identifier by learning (training) the learning model based on the feature information extracted at step S23 (Step S24).

Next, the teaching data updating unit 18 acquires the respective identification results outputted by the first identifier and by the second identifier for the evaluation data stored in the evaluation data storage unit 24 (step S25). Then, when the identification accuracy of the second identifier calculated based on the identification result outputted by the second identifier is higher than the identification accuracy of the first identifier calculated based on the identification result outputted by the first identifier (step S26; Yes), the teaching data updating unit 18 updates the correction target teaching data DT so as to reflect the correction candidate area FC therein and stores the identifier information indicative of the second identifier as the identifier information indicative of the first identifier in the identifier information storage unit 21 (Step S27). Thereafter, when the setting of the correction candidate area FC is executed a predetermined number of times or more or the identification accuracy is equal to or higher than a predetermined threshold value (Step S28; Yes), the teaching data updating unit 18 ends the processing of the flowchart. On the other hand, when the setting of the correction candidate area FC is executed less than the predetermined number of times and the identification accuracy is smaller than the predetermined threshold value (Step S28; No), the teaching data updating unit 18 returns the process to step S22.

As described above, according to the second example embodiment, the teaching data correction device 10 can perform the correction to improve the identification accuracy of the identifier, wherein the identifier is obtained by learning the object area information of the correction target teaching data DT based on the corrected teaching data. Thus, it is possible to correct the teaching data necessary for improving the identification accuracy without relying on the individual person's technique and suitably reduce the burden required for the teaching data correction.

Third Example Embodiment

Figure 9:
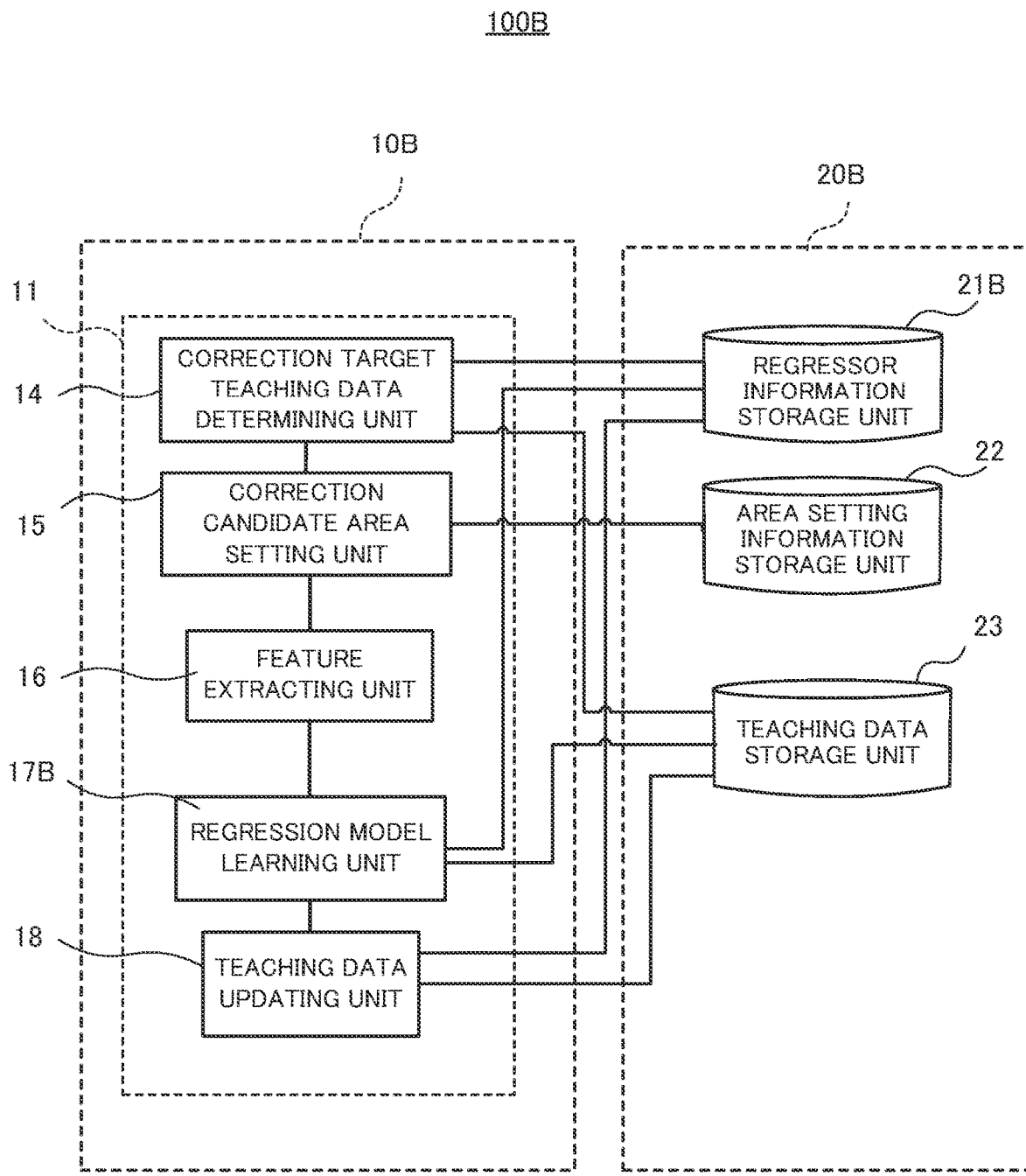
FIG. 9 illustrates a schematic configuration of a teaching data correction system according to a third example embodiment.

FIG. 9 is a schematic configuration of a teaching data correction system 100B according to a third example embodiment. The teaching data correction system 100B according to the third example embodiment differs from the teaching data correction system 100 according to the first example embodiment in that it has a regression model learning unit 17B instead of the identification model learning unit 17 and has a regressor (regression machine) information storage unit 21B instead of the identifier information storage unit 21. Other components which are substantially the same as those of the first example embodiment are denoted by the same reference numerals, and description thereof will be omitted.

The regressor information storage unit 21B stores regressor information that is various information such as parameters required to function a regressor (regression machine), wherein the regressor is generated by training a learning model (also referred to as a "regression model") designed to output a coordinate value or the like indicating the position of a feature point to be regressed in response to the inputted training image. The regression model described above may be a learning model based on a neural network or may be other types of regression models such as a support vector machine. Specifically, the regressor information storage unit 21B stores the regressor information indicative of the regressor obtained by training the regression model based on the teaching data stored in the teaching data storage unit 23. This regressor information is updated based on the regressor information indicative of the regressor generated by the regression model learning unit 17B.

The teaching data stored in the teaching data storage unit 23 includes feature point information indicating the position of specific feature point(s) to be extracted in the object area in addition to the object area information and the identification information indicative of the object in the object area.

The correction target teaching data determining unit 14 determines the correction target teaching data DT based on a result obtained by inputting a training image corresponding to the teaching data stored in the teaching data storage unit 23 to the regressor configured by referring to the regressor information storage unit 21B. In this case, the regressor outputs the position information of the target feature point such as the coordinate value in the image as a regression result. Therefore, for example, the correction target teaching data determining unit 14 calculates, as an index value representing the regression accuracy, the distance between the position which the regressor outputs and the position indicated by the feature point information included in the corresponding teaching data. Then, the correction target teaching data determining unit 14 regards the teaching data whose distance is equal to or larger than a predetermined distance as the teaching data with a low regression accuracy and specifies the teaching data as the correction target teaching data DT.

The regression model learning unit 17B generates a regressor obtained by learning (training) a regression model which is an arithmetic model configured to output coordinates of predetermined feature point(s) of a regression target. In this case, the regression model learning unit 17B generates the regressor by learning the regression model based on the feature information supplied from the feature extracting unit 16. Hereafter, it is assumed that the term "first regressor" refers to a regressor based on the regressor information stored in the regressor information storage unit 21B, which is generated before generation of the regressor by the regression model learning unit 17B, and the term "second regressor" refers to a regressor based on the regressor information generated by the regression model learning unit 17B.

The teaching data updating unit 18 supplies the correction candidate area setting unit 15 with the accuracy comparison information Ic indicating the comparison result between the regression accuracy of the second regressor based on the regression result outputted by the second regressor generated by the regression model learning unit 17B and the regression accuracy of the first regressor based on the regression result outputted by the first regressor. In this case, for example, the teaching data updating unit 18 determines that the regression accuracy of the second regressor increases with decrease in the distance between the position which the second regressor outputs and the position which the feature point information included in the corresponding teaching data indicates. In the case where training images corresponding to a plurality of teaching data are each inputted to the second regressor, the teaching data updating unit 18 determines that the regression accuracy of the second regressor increases with decrease in the average value (or another representative value) of the above-described distances calculated for all the inputted training images. In the same way, for example, the teaching data updating unit 18 determines that the regression accuracy of the first regressor increases with decrease in the distance between the coordinate value outputted by the first regressor and the coordinate value indicated by the feature point information included in the corresponding teaching data.

Further, if the teaching data updating unit 18 determines that the regression result outputted by the second regressor is equal to or larger than a predetermined regression accuracy or that the number of times of setting the correction candidate area FC for the same correction target teaching data DT is equal to or larger than a predetermined number of times, the teaching data updating unit 18 terminates the process of setting the correction candidate area FC for the target correction target teaching data DT.

Figure 10A:
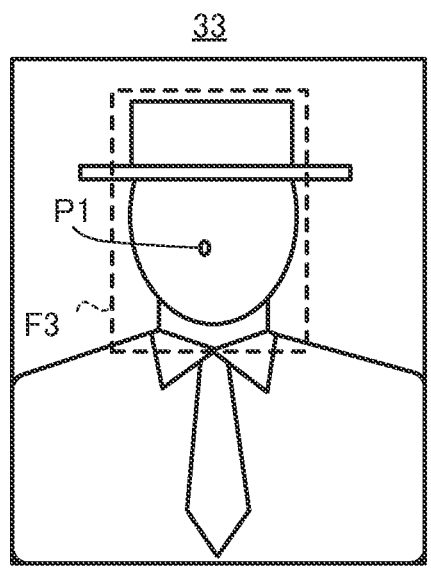
FIG. 10A illustrates the position of a nose indicated by feature point information and an object area indicated by the correction target teaching data on an image corresponding to the teaching data in which a nose is a target feature point.
Figure 10B:
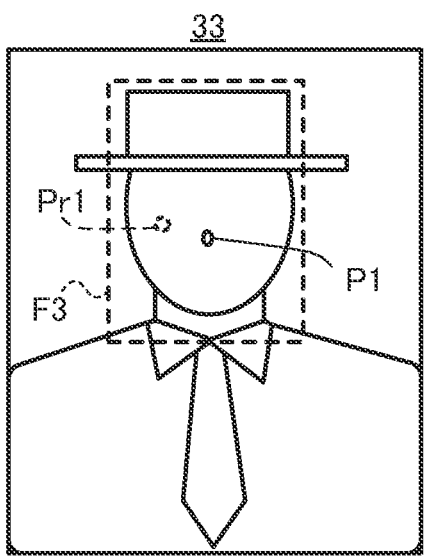
FIG. 10B illustrates the position of the nose based on the regression result by the second regressor on the image corresponding to the correction target teaching data.
Figure 10C:
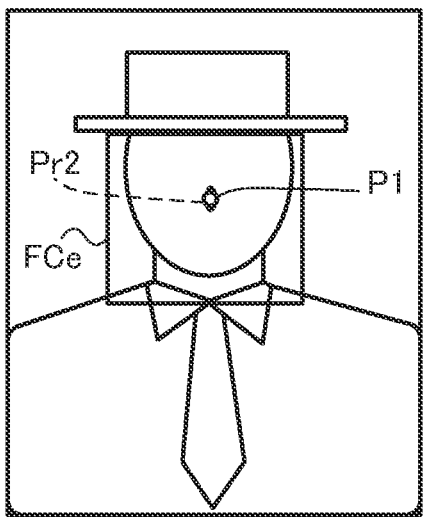
FIG. 10C illustrates the correction candidate area set based on the object area and the position of the nose based on the regression result by the second regressor learned by the teaching data in which the correction candidate area is reflected.

FIG. 10A illustrates the object area "F3" of the face indicated by the object area information included in the correction target teaching data DT and the position "P1" of the nose indicated by the feature point information on the training image 33 corresponding to the teaching data whose feature point is the nose. FIG. 10B illustrates the position "Pr1" of the nose specified on the image corresponding to the correction target teaching data DT based on the regression result by the second regressor. FIG. 10C illustrates the position "Pr2" of the nose and the correction candidate area "FCe" set based on the object area F3, wherein the position Pr2 is based on the regression result outputted by the second regressor that is learned by using the teaching data in which the correction candidate area FCe is reflected. Here, the object area F3 and the positions Pr1 and Pr2 are each indicated by a broken line, and the position P1 and the correction candidate area FCe are each indicated by a solid line.

As shown in FIG. 10A and FIG. 10B, the object area F3 indicated by the object area information of the target teaching data is set to the area of the face and the hat, and the distance between the position Pr1 of the nose and the position P1 of the nose indicated by the feature point information based on the regression result outputted by the second regressor is equal to or greater than the predetermined distance. In this case, the teaching data correction device 10B regards the target teaching data as the correction target teaching data DT and sets the correction candidate area FC.

The correction candidate area FCe shown in FIG. 10C, while including the entire area of the face, is set to an area which does not include the area of the hat. In this case, the distance between the position P1 of the nose indicated by the feature point information and the position Pr2 of the nose based on the regression result outputted by the second regressor learned by use of the teaching data in which the correction candidate area FCe is reflected is equal to or shorter than the predetermined distance. In this case, the teaching data correction device 10B determines that the regression accuracy is equal to or higher than the predetermined threshold value and updates the correction target teaching data DT so as to reflect the correction candidate area FCe in the correction target teaching data DT.

Figure 11:
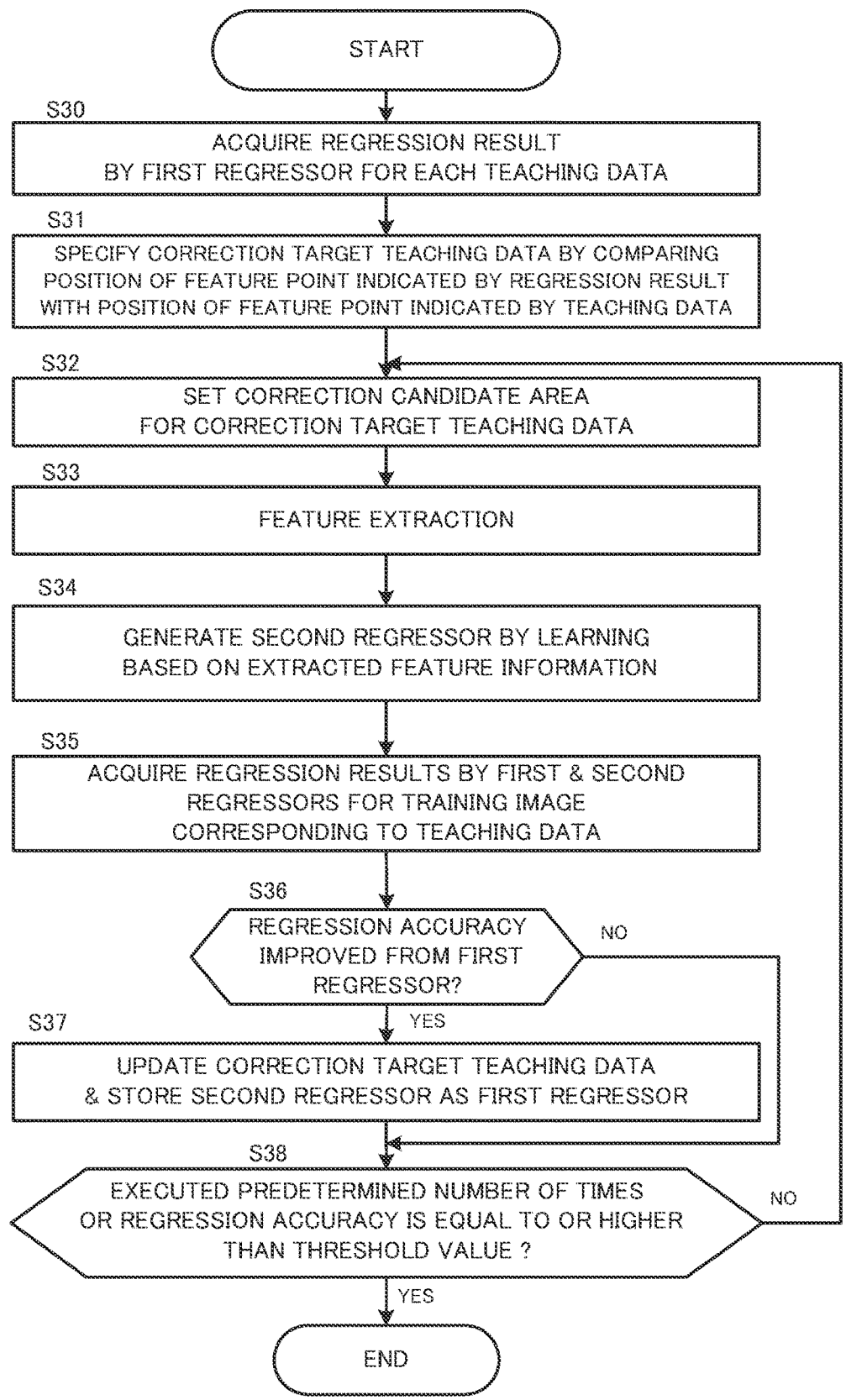
FIG. 11 is a flowchart executed by the teaching data correction device according to the third example embodiment.

FIG. 11 is an example of a flow chart executed by the teaching data correction device 10B according to the third example embodiment.

First, the correction target teaching data determining unit 14 configures the first regressor based on the regressor information stored in the identifier information storage unit 21, and acquires the regression result by the first regressor for each training image of each teaching data stored in the teaching data storage unit 23 (Step S30). Next, the correction target teaching data determining unit 14 specifies the correction target teaching data DT by comparing the position of the feature point indicated by the regression result outputted by the first regressor with the position indicated by the feature point information of the teaching data (Step S31). For example, the correction target teaching data determining unit 14 specifies, as the correction target teaching data DT, the teaching data whose distance between the position of the feature point indicated by the regression result outputted by the first regressor and the position of the feature point indicated by the feature point information of the corresponding teaching data is equal to or larger than the predetermined distance. Then, the teaching data correction device 10B executes the process at following step S32 and subsequent steps for each of the correction target teaching data DT specified at step S31.

First, the correction candidate area setting unit 15 sets the correction candidate area FC for the correction target teaching data DT (step S32). Then, the correction candidate area setting unit 15 performs feature extraction on the correction candidate area FC indicated by the correction target teaching data DT set at step S32 (Step S33). Then, the identification model learning unit 17 generates the second regressor by training the learning model based on the feature information extracted at step S33 (Step S34).

Next, the teaching data updating unit 18 acquires the respective regression results outputted by the first regressor and the second regressor for the training image corresponding to the teaching data stored in the teaching data storage unit 23 (Step S35). The regression results outputted by the first regressor and the second regressor in this case indicates the position where the feature point of interest is estimated to be present. Then, the teaching data updating unit 18 determines whether or not the regression accuracy (i.e., regressively obtained positional accuracy) of the second regressor calculated based on the regression result outputted by the second regressor is higher than the regression accuracy of the first regressor calculated based on the regression result outputted by the first regressor (step S36).

Then, when the teaching data updating unit 18 determines that the regression accuracy of the second regressor is higher than the regression accuracy of the first regressor (step S36; Yes), the teaching data updating unit 18 updates the correction target teaching data DT and stores the regressor information indicative of the second regressor stored as the regressor information indicative of the first regressor in the identifier information storage unit 21 (step S37). In this case, the teaching data updating unit 18 updates the correction target teaching data DT so that the object area information of the correction target teaching data DT indicates the correction candidate area FC set at step S32.

Thereafter, when the setting of the correction candidate area FC is executed a predetermined number of times or more, or when the regression accuracy becomes the predetermined threshold value or more (step S38; Yes), the teaching data updating unit 18 terminates the processing of the flowchart. Meanwhile, when the setting of the correction candidate area FC is executed less than the predetermined number of times and the regression accuracy is less than the predetermined threshold value (step S38; No), the teaching data updating unit 18 returns the process to step S32.

As described above, according to the third example embodiment, the teaching data correction device 10B can correct the object area information of the correction target teaching data DT so as to improve the regression accuracy of the regressor obtained by learning the object area information of the correction target teaching data DT based on the corrected teaching data. Thus, the correction of the teaching data necessary for improving the regression accuracy can be performed without relying on the individual person's technique, and the burden required for correcting the teaching data can be suitably reduced.

The third example embodiment can be combined with the second example embodiment. Specifically, in some example embodiments, the teaching data correction system 100B according to the third example embodiment has an evaluation data storage unit 24 and the teaching data updating unit 18 calculates the regression accuracy of the first regressor and the second regressor based on the evaluation data stored in the evaluation data storage unit 24.

Fourth Example Embodiment

In the third example embodiment, an example of using a regressor that is a learned regression model configured to output the coordinates of feature point(s) is described. Alternatively, the teaching data correction device 10 according to the fourth example embodiment executes the same processing as the third example embodiment by using the first identifier and the second identifier each of which is a learned identification model configured to identify the pixel position of the target feature point(s).

In this case, for example, the identification model learning unit 17 learns the first identifier and the second identifier so that the identifier outputs, when an image corresponding to the teaching data is inputted thereto, a binary image or a reliability map indicating a determination result as to whether or not each pixel in the input image corresponds to the target feature point. In this case, the reliability map is a map showing the reliability of each pixel in the input image as the target feature point. The particle size of the reliability map is not limited to a pixel, and the reliability map may indicate the reliability with respect to each block of a plurality of pixels, or may indicate the reliability in units of sub-pixels.

When the teaching data updating unit 18 acquires the identification result outputted by the second identifier, for example, the teaching data updating unit 18 determines that the identification accuracy of the second identifier increases with decrease in the distance between the position of the feature point indicated by the binary image or the reliability map which is the identification result outputted by the second identifier and the position of the feature point indicated by the feature point information of the corresponding teaching data. The "position of the feature point indicated by the reliability map" is, for example, the pixel position with the highest reliability. In addition, when training images corresponding to the plurality of teaching data are each inputted to the second identifier, the teaching data updating unit 18 determines that the identification accuracy of the second identifier increases with decreasing average value (or another representative value) of the distances described above for all the inputted training images. The teaching data updating unit 18 calculates the identification accuracy of the first identifier in substantially the same manner as the identification accuracy of the second identifier.

Further, the correction target teaching data determining unit 14 determines the correction target teaching data DT based on the result obtained by inputting the training image corresponding to the teaching data to the first identifier configured by referring to the identifier information storage unit 21. In this case, for example, the correction target teaching data determining unit 14 specifies, as the correction target teaching data DT, such teaching data that the distance between the position of the feature point indicated by the binary image or the reliability map that is the identification result outputted by the first identifier and the position of the feature point indicated by the feature point information of the corresponding teaching data is equal to or longer than a predetermined distance.

As described above, even according to the fourth example embodiment, the teaching data correction device 10 can correct the object area information of the correction target teaching data DT so as to improve identification accuracy of the identifier learned based on the corrected teaching data. Thus, the correction of the teaching data necessary for improving the identification accuracy can be performed without relying on the individual person's technique, and the burden required for correcting the teaching data can be suitably reduced.

Modification

The teaching data correction device 10 may not have a function corresponding to the correction target teaching data determining unit 14 and the feature extracting unit 16.

Figure 12:
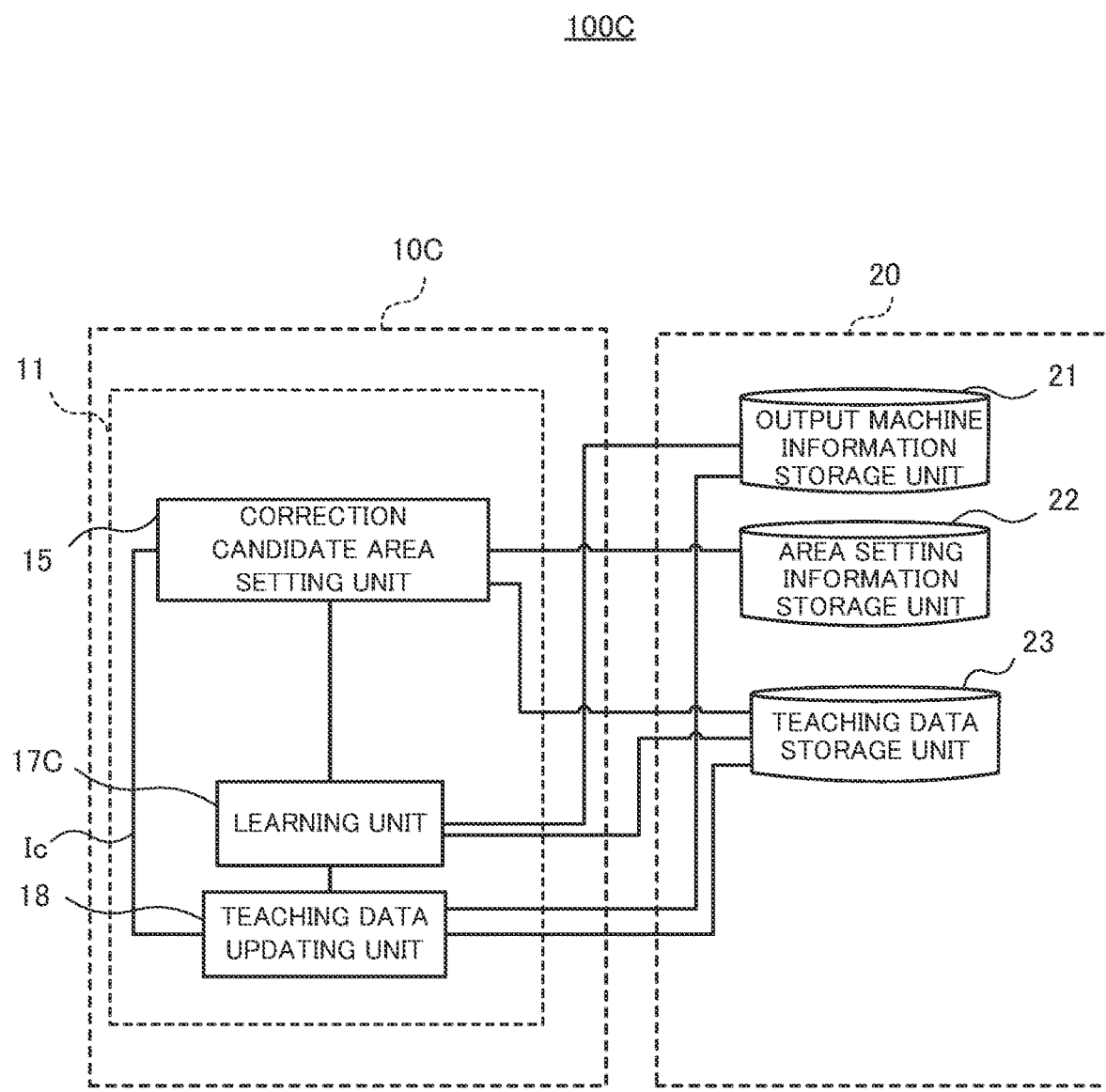
FIG. 12 illustrates the schematic configuration of the teaching data correction system according to a modification.

FIG. 12 is a schematic configuration of a teaching data correction system 100C according to a modified example embodiment. In the example embodiment indicated by FIG. 12, the processor 11 of the teaching data correction device 10C functionally includes a correction candidate area setting unit 15, a learning unit 17C and a teaching data updating unit 18.

In this case, the correction candidate area setting unit 15 regards teaching data selected from teaching data stored in the teaching data storage unit 23 as the correction target teaching data DT and sets the correction candidate area FC for the correction target teaching data DT. In this case, the correction candidate area setting unit 15 may select any teaching data stored in the teaching data storage unit 23 as the correction target teaching data DT. If metadata indicating the necessity of the correction is assigned to teaching data, the correction candidate area setting unit 15 may determine the correction target teaching data DT according to the metadata.

Then, the learning unit 17C generates an identifier or a regressor (collectively referred to as "output machine") by learning (training) the identification model or the regression model based on the teaching data in which the correction candidate area FC supplied from the correction candidate area setting unit 15 is reflected. Then, on the basis of the identification accuracy or the regression accuracy (collectively referred to as "output accuracy") of the second output machine learned by the learning unit 17C, the teaching data updating unit 18 determines whether or not the correction target teaching data DT is updated by the correction candidate area FC according to the same determination criteria as the first to fourth example embodiments.

The correction candidate area setting unit 15 may set a plurality of correction candidate areas FC for the correction target teaching data DT without receiving the accuracy comparison information Ic from the teaching data updating unit 18. In this case, for example, the learning unit 17C generates the output machines for the plurality of correction candidate areas FC, respectively, and the teaching data updating unit 18 compares the output accuracy for each of the output machines and updates the correction target teaching data DT by the correction candidate areas FC used for learning the output machine with the highest output accuracy. In this case, the correction candidate area setting unit 15 and the teaching data updating unit 18 does not need to transmit and receive the accuracy comparison information Ic.

The whole or a part of the example embodiments described above (including modifications, the same applies hereinafter) can be described as, but not limited to, the following Supplementary Notes.

[Supplementary Note 1]

A correction method executed by a teaching data correction device, the correction method comprising:

setting, for teaching data indicating an object area where an object of interest exists in a training image, a correction candidate area which is an area to be a correction candidate of the object area, the training image being used for learning;

generating an output machine based on the correction candidate area, the output machine being learned to output, when an image is inputted thereto, an identification result or a regression result relating to the object of the interest; and updating the teaching data by the correction candidate area based on an accuracy of the output machine, the accuracy being calculated based on the identification result or the regression result outputted by the output machine.

[Supplementary Note 2]

The correction method according to Supplementary Note 1, wherein the updating the teaching data is updating the teaching data by the correction candidate area in a case where an accuracy of a second output machine that is the output machine is higher than an accuracy of a first output machine, the first output machine being learned to output, when an image is inputted thereto, an identification result or a regression result relating to the object of the interest based on the teaching data before setting the correction candidate area, the second output machine being learned based on the correction candidate area.

[Supplementary Note 3]

The correction method according to Supplementary Note 2, wherein the setting the correction candidate area is setting the correction candidate area, which is different from any previously-set correction candidate area, based on information indicative of a comparison result between the accuracy of the first output machine and the accuracy of the second output machine.

[Supplementary Note 4]

The correction method according to Supplementary Note 2 or 3, wherein the setting the correction candidate area includes learning a learning model configured to output the correction candidate area based on information indicative of a comparison result between the accuracy of the first output machine and the accuracy of the second output machine.

[Supplementary Note 5]

The correction method according to any one of Supplementary Notes 1 to 4, wherein the setting the correction candidate area is setting the correction candidate area which is different from any previously-set correction candidate area in a case where the accuracy of the output machine is smaller than a threshold value and the number of times of setting the correction candidate area is smaller than a predetermined number of times.

[Supplementary Note 6]

The correction method according to any one of Supplementary Notes 1 to 5, further comprising extracting a feature from the training image corresponding to the correction candidate area, wherein the generating the output machine is generating the output machine by learning the output machine based on the feature.

[Supplementary Note 7]

The correction method according to any one of Supplementary Notes 1 to 6, further comprising determining the teaching data, in which the correction candidate area is to be set, from the teaching data corresponding to a plurality of training images stored in a storage unit based on an identification result or a regression result relating to the object of the interest by an output machine, the output machine being learned based on teaching data corresponding to the plurality of the training images.

[Supplementary Note 8]

The correction method according to any one of Supplementary Notes 1 to 7, wherein the updating the teaching data includes calculating the accuracy of the output machine based on the identification result or the regression result outputted by the output machine when the training image corresponding to the teaching data used for learning of the output machine is inputted to the output machine.

[Supplementary Note 9]

The correction method according to any one of Supplementary Notes 1 to 7, wherein the updating the teaching data includes calculating the accuracy of the output machine based on the identification result or the regression result outputted by the output machine when evaluation data that is different from the training image corresponding to the teaching data used for learning of the output machine is inputted to the output machine.

[Supplementary Note 10]

The correction method according to any one of Supplementary Notes 1 to 9, wherein the generating the output machine is generating, as the output machine, an output machine that is learned based on the correction candidate area to output the identification result or the regression result relating to a position of a feature point of the object of the interest in the inputted image.

[Supplementary Note 11]

A teaching data correction device comprising:

a correction candidate area setting unit configured to set, for teaching data indicating an object area where an object of interest exists in a training image, a correction candidate area which is an area to be a correction candidate of the object area, the training image being used for learning;

a learning unit configured to generate an output machine based on the correction candidate area, the output machine being learned to output, when an image is inputted thereto, an identification result or a regression result relating to the object of the interest; and a teaching data updating unit configured to update the teaching data by the correction candidate area based on an accuracy of the output machine, the accuracy being calculated based on the identification result or the regression result outputted by the output machine.

[Supplementary Note 12]

A program executed by a computer, the program causing the computer to function as:

a correction candidate area setting unit configured to set, for teaching data indicating an object area where an object of interest exists in a training image, a correction candidate area which is an area to be a correction candidate of the object area, the training image being used for learning;

a learning unit configured to generate an output machine based on the correction candidate area, the output machine being learned to output, when an image is inputted thereto, an identification result or a regression result relating to the object of the interest; and a teaching data updating unit configured to update the teaching data by the correction candidate area based on an accuracy of the output machine, the accuracy being calculated based on the identification result or the regression result outputted by the output machine.

While the invention has been particularly shown and described with reference to example embodiments thereof, the invention is not limited to these embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent Literatures mentioned in this specification are incorporated by reference in its entirety.

DESCRIPTION OF REFERENCE NUMERALS 10, 10B, 10C Teaching data correction device
11 Processor
12 Memory
13 Interface
20 Storage device
21 Identifier information storage unit
22 Area setting information storage unit
23 Teaching data storage unit
100, 100A to 100C Teaching data correction system

What is claimed is:

1. A correction method executed by a teaching data correction device, the correction method comprising:

setting, for teaching data indicating an object area where an object of interest exists in a training image, a correction candidate area which is an area to be a correction candidate of the object area, the training image being used for learning;

generating an output machine based on the correction candidate area, the output machine being learned to output, when an image is inputted thereto, an identification result or a regression result relating to the object of the interest; and updating the teaching data by the correction candidate area based on an accuracy of the output machine, the accuracy being calculated based on the identification result or the regression result outputted by the output machine.

2. The correction method according to claim 1, wherein the updating the teaching data is updating the teaching data by the correction candidate area in a case where an accuracy of a second output machine that is the output machine is higher than an accuracy of a first output machine, the first output machine being learned to output, when an image is inputted thereto, an identification result or a regression result relating to the object of the interest based on the teaching data before setting the correction candidate area, the second output machine being learned based on the correction candidate area.

3. The correction method according to claim 2, wherein the setting the correction candidate area is setting the correction candidate area, which is different from any previously-set correction candidate area, based on information indicative of a comparison result between the accuracy of the first output machine and the accuracy of the second output machine.

4. The correction method according to claim 2, wherein the setting the correction candidate area includes learning a learning model configured to output the correction candidate area based on information indicative of a comparison result between the accuracy of the first output machine and the accuracy of the second output machine.

5. The correction method according to claim 1, wherein the setting the correction candidate area is setting the correction candidate area which is different from any previously-set correction candidate area in a case where the accuracy of the output machine is smaller than a threshold value and the number of times of setting the correction candidate area is smaller than a predetermined number of times.

6. The correction method according to claim 1, further comprising extracting a feature from the training image corresponding to the correction candidate area, wherein the generating the output machine is generating the output machine by learning the output machine based on the feature.

7. The correction method according to claim 1, further comprising determining the teaching data, in which the correction candidate area is to be set, from the teaching data corresponding to a plurality of training images stored in a storage unit based on an identification result or a regression result relating to the object of the interest by an output machine, the output machine being learned based on teaching data corresponding to the plurality of the training images.

8. The correction method according to claim 1,
wherein the updating the teaching data includes calculating the accuracy of the output machine based on the identification result or the regression result outputted by the output machine when the training image corresponding to the teaching data used for learning of the output machine is inputted to the output machine.

9. The correction method according to claim 1,
wherein the updating the teaching data includes calculating the accuracy of the output machine based on the identification result or the regression result outputted by the output machine when evaluation data that is different from the training image corresponding to the teaching data used for learning of the output machine is inputted to the output machine.

10. The correction method according to claim 1,
wherein the generating the output machine is generating, as the output machine, an output machine that is learned based on the correction candidate area to output the identification result or the regression result relating to a position of a feature point of the object of the interest in the inputted image.

11. A teaching data correction device comprising a processor configured to:
set, for teaching data indicating an object area where an object of interest exists in a training image, a correction candidate area which is an area to be a correction candidate of the object area, the training image being used for learning;
generate an output machine based on the correction candidate area, the output machine being learned to output, when an image is inputted thereto, an identification result or a regression result relating to the object of the interest; and
update the teaching data by the correction candidate area based on an accuracy of the output machine, the accuracy being calculated based on the identification result or the regression result outputted by the output machine.

12. The teaching data correction device according to claim 11,
wherein the processor is configured to update the teaching data by the correction candidate area in a case where an accuracy of a second output machine that is the output machine is higher than an accuracy of a first output machine, the first output machine being learned to output, when an image is inputted thereto, an identification result or a regression result relating to the object of the interest based on the teaching data before setting the correction candidate area, the second output machine being learned based on the correction candidate area.

13. The teaching data correction device according to claim 12,
wherein the processor is configured to set the correction candidate area, which is different from any previously-set correction candidate area, based on information indicative of a comparison result between the accuracy of the first output machine and the accuracy of the second output machine.

14. The teaching data correction device according to claim 12,
wherein the processor is configured to learn a learning model configured to output the correction candidate area based on information indicative of a comparison result between the accuracy of the first output machine and the accuracy of the second output machine.

15. The teaching data correction device according to claim 11,
wherein the processor is configured to set the correction candidate area which is different from any previously-set correction candidate area in a case where the accuracy of the output machine is smaller than a threshold value and the number of times of setting the correction candidate area is smaller than a predetermined number of times.

16. The teaching data correction device according to claim 11,
wherein the processor is further configured to extract a feature from the training image corresponding to the correction candidate area, and
wherein the processor is configured to generate the output machine by learning the output machine based on the feature.

17. The teaching data correction device according to claim 11,
wherein the processor is further configured to determine the teaching data, in which the correction candidate area is to be set, from the teaching data corresponding to a plurality of training images stored in a storage unit based on an identification result or a regression result relating to the object of the interest by an output machine, the output machine being learned based on teaching data corresponding to the plurality of the training images.

18. The teaching data correction device according to claim 11,
wherein the processor is configured to calculate the accuracy of the output machine based on the identification result or the regression result outputted by the output machine when the training image corresponding to the teaching data used for learning of the output machine is inputted to the output machine.

19. The teaching data correction device according to claim 11,
wherein the processor is configured to calculate the accuracy of the output machine based on the identification result or the regression result outputted by the output machine when evaluation data that is different from the training image corresponding to the teaching data used for learning of the output machine is inputted to the output machine.

20. A non-transitory computer readable medium including a program executed by a computer, the program causing the computer to:
set, for teaching data indicating an object area where an object of interest exists in a training image, a correction candidate area which is an area to be a correction candidate of the object area, the training image being used for learning;
generate an output machine based on the correction candidate area, the output machine being learned to output, when an image is inputted thereto, an identification result or a regression result relating to the object of the interest; and update the teaching data by the correction candidate area based on an accuracy of the output machine, the accuracy being calculated based on the identification result or the regression result outputted by the output machine.

\* \* \* \* \*